US008224152B2

(12) United States Patent
Ryu (10) Patent No.: US 8,224,152 B2
(45) Date of Patent: Jul. 17, 2012

(54) APPARATUS AND METHOD FOR REPRODUCING TEXT FILE IN DIGITAL VIDEO DEVICE

(75) Inventor: Han Seop Ryu, Suwon-si (KR)

(73) Assignee: LG Electronics Inc., Seoul (KR)

( * ) Notice: Subject to any disclaimer, the term of this patent is extended or adjusted under 35 U.S.C. 154(b) by 1375 days.

(21) Appl. No.: 11/481,967

(22) Filed: Jul. 7, 2006

(65) Prior Publication Data

US 2007/0016846 A1 Jan. 18, 2007

(30) Foreign Application Priority Data

Jul. 7, 2005 (KR) ........................ 10-2005-0061277

(51) Int. Cl.
*H04N 5/92* (2006.01)

(52) U.S. Cl. ............. 386/245; 386/E9.013; 386/E9.036; 715/202

(58) Field of Classification Search .................... 386/94, 386/E9.013, E9.036; 715/500.1, 202
See application file for complete search history.

(56) References Cited

U.S. PATENT DOCUMENTS

| 2003/0086690 A1* | 5/2003 | Chung et al. ..................... 386/69 |
| 2003/0235397 A1* | 12/2003 | Chu ................................ 386/46 |
| 2005/0013207 A1* | 1/2005 | Tsumagari et al. ............. 369/14 |
| 2005/0039207 A1* | 2/2005 | Park et al. ....................... 725/40 |

FOREIGN PATENT DOCUMENTS

| KR | 1998-085457 | | 12/1998 |
| KR | 10-2005-0001850 | * | 1/2005 |
| KR | 10-2005-0001850 A | | 1/2005 |

* cited by examiner

*Primary Examiner* — Thai Tran
*Assistant Examiner* — Girumsew Wendmagegn
(74) *Attorney, Agent, or Firm* — Birch, Stewart, Kolasch & Birch, LLP

(57) ABSTRACT

Apparatus and method for reproducing texts in a digital video device, are discussed. According to an embodiment of the present invention, the method includes automatically selecting a text conversion table for the digital video device, and reproducing text data stored on a recording medium using the selected text conversion table.

18 Claims, 6 Drawing Sheets

FIG. 1

FIG. 2A (Country Code / Language Code)

FIG. 2B

| Country Code | Language |
|---|---|
| USA, Canada, GB | English |
| France | French |
| China, Taiwan | Chinese |
| Korea | Korean |
| | |

APPARATUS AND METHOD FOR REPRODUCING TEXT FILE IN DIGITAL VIDEO DEVICE

This application claims the benefit of the Korean Patent Application No. 10-2005-0061277 filed on Jul. 7, 2005 in Republic of Korea, the entire contents of which are hereby fully incorporated by reference

BACKGROUND OF THE INVENTION

1. Field of the Invention

The present invention relates to an apparatus and a method for reproducing texts in a digital video device, and more particularly to an apparatus and a method for processing text data, which must be reproduced in connection with audio and video (A/V) data, into character images suitable for a user in a digital video device such as a Digital Versatile Disc (DVD) player.

2. Description of the Related Art

Recently, various types of digital video devices have been commercialized, which can reproduce Digital Internet Video eXpress (hereinafter, referred to as DivX) files stored in a storage medium such as an optical disc or a hard disc. In a DivX file, video data based on an MPEG-4 format and audio data based on an MP3 format are stored as one A/V file. Text data or a file such as a sub-title of a DVD may be included in a DivX file or stored in the same directory as a separate file.

For example, when an arbitrary DivX file stored on an optical disc is reproduced at a user's request, a digital video device decodes video data, which are included in the DivX file, based on the MPEG-4 format, thereby outputting video images of high quality. Further, the digital video device decodes audio data based on the MP3 format, thereby outputting audio of high quality Furthermore, the digital video device decodes and converts text data included in the DivX file into characters of a language by means of a text conversion table of an arbitrary language, and outputs character images. Accordingly, a user can watch both a main video image of high quality and character images overlapped on the main video image through a display device such as a television, while at the same time hearing audio of high quality.

However, the related art digital video device must use a text conversion table of a predetermined language in order to convert text files or text data into appropriate character images (images of text characters). Herein, a user must designate a language for a text conversion table to be used for converting the text data into an appropriate language image. This involves requiring a user to designate a text conversion table of a language desired by the user through a menu screen involving a complicated multi-step manipulation. For instance, if a user desires to view a subtitle (or caption) in English language, then the user must go through multiple menu screens and make the selection of English language, so that the text conversion table of English language is selected and used to convert the text data.

SUMMARY OF THE INVENTION

Accordingly, the present invention has been made to address the above-mentioned and other problems and disadvantages associated with the related art It is an object of the present invention to provide a method and an apparatus for converting text data, which are reproduced in connection with A/V data, into character images of a language desired by a user.

It is another object of the present invention to provide a method and an apparatus for automatically selecting a text conversion table to be used for converting text data into text character images.

In order to achieve the above and other objects, according to one aspect of the present invention, there is provided a method for reproducing texts in a digital video device, the method comprising automatically selecting a text conversion table for the digital video device; and reproducing text data stored on a recording medium using the selected text conversion table.

According to another aspect of the present invention, there is provided an apparatus for reproducing texts, the apparatus comprising a controller to automatically select a text conversion table for the apparatus; and a text generator to reproduce text data stored on a recording medium using the selected text conversion table.

According to another aspect of the present invention, there is provided a method for reproducing texts in a digital video device, the method comprising: automatically selecting a text conversion table for the digital video device; and reproducing text data associated with DivX audio data and/or DivX video data using the selected text conversion table.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Hereinafter, preferred embodiments of the present invention will be described with reference to the accompanying drawings.

Figure 1:
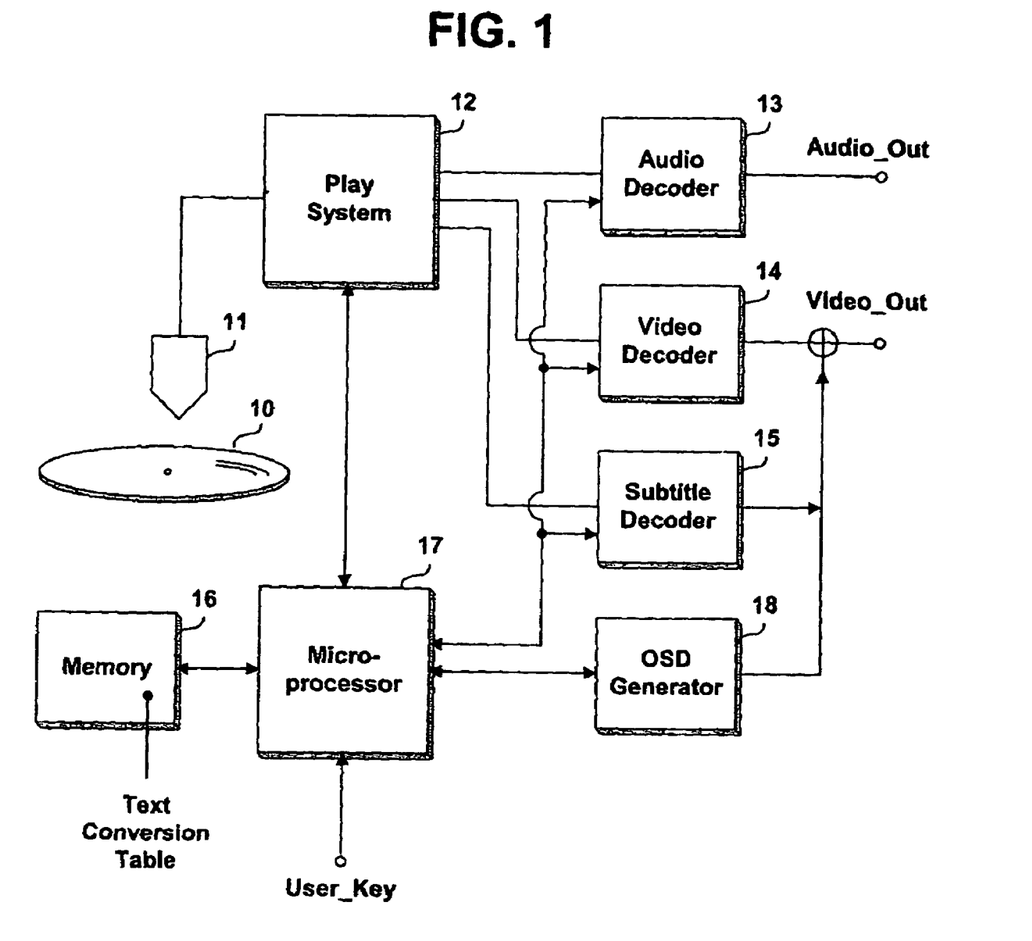
FIG. 1 is a block diagram illustrating a construction of a digital video device according to an embodiment of the present invention.

An apparatus and a method for reproducing texts according to the present invention can be applied to various types of digital devices for reproducing text data in connection with audio and video (A/V) data. A digital video device such as a DVD player or karaoke machine, etc may include an optical pickup 11 for accessing a recording medium such as an optical disc 10 (e.g., a CD, a DVD, etc.), a play system 12, an audio decoder 13, a video decoder 14, a text or subtitle decoder (text generator) 15, a memory 16, a microprocessor 17, an On-Screen Display (OSD) generator 18, etc., as illustrated in FIG. 1. All the components of the digital video device are operatively coupled.

Figure 2A:
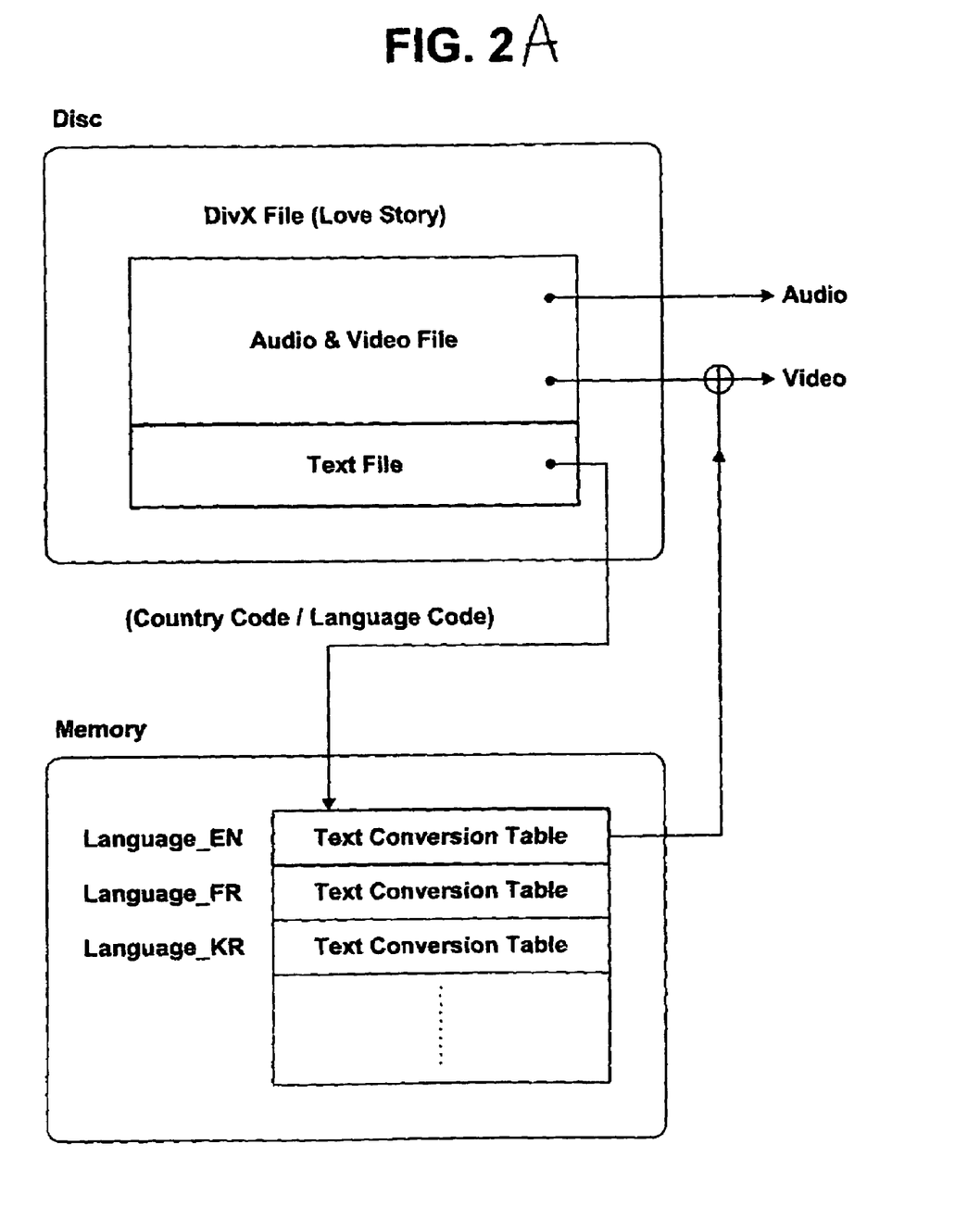
FIG. 2A is a diagram illustrating an example of a process for reproducing text data according to an embodiment of the present invention.

The microprocessor 17 controls an operation of the play system 12 to reproduce a data file (e.g. a DivX file) written on the optical disc 10 at a user's request. As shown in FIG. 2A, in a DivX file or a directory written on the optical disc 10, video data based on an MPEG-4 format and audio data based on an MP3 format are stored as one A/V file, and a text file for providing an option or effect such as a sub-title of a DVD is included.

The audio decoder 13 decodes DivX audio data (e.g., from the A/V file), which are read by the play system 12, based on the MP3 format, thereby outputting audio of high quality. The video decoder 14 decodes DivX video data (e.g., from the A/V file), which are read by the play system 12, based on the MPEG-4 format, thereby outputting video of high quality.

The text decoder 15 converts the DivX text data (e.g., from the text file in the DivX file) read by the play system 12 into character images of a language by means of the text conversion table of an arbitrary language. The character images overlap or are overlaid on a main video image output from the video decoder 14 for display.

When the DivX text data are reproduced, the microprocessor 17 checks a preset country code, which can be represented in, e.g, 2 bytes This preset country code represents a unique country identification code that is used as a reference when different parental lock levels are set in the digital video devices for use in different countries. Such setting of country codes is known. For instance, the manufacturer may set a country code of USA in a digital video device that is to be used in USA, for use in parental lock operations. The present invention merely utilizes the country code already preset in conventional digital video devices. Tat is, the country code may be set as a unique value by each manufacturer for manufacturing digital video devices such as DVD players, or by each seller for selling digital video devices, or by others.

As illustrated in FIG. 2A, the microprocessor 17 selects a text conversion table of a language corresponding to the preset country code from a plurality of text conversion tables stored in the memory 16, and decodes the text data using the selected text conversion table, thereby converting the text data into character images and outputting the character images (e.g., displaying the subtitles). In this regard, the present invention may use a map table providing a language associated with a particular country for a plurality of different countries. This map table may be stored in the memory 16 and updated as needed. One example of such map table is provided in FIG. 2B For example, if the preset country code (associated with the optical disc or the disc device) corresponds to USA in which English is used as the official language (e.g., according to the map table of FIG. 2B), the microprocessor 17 selects an English text conversion table (Language_EN in FIG. 2A) from a plurality of text conversion tables stored in the memory 16. Accordingly, the text decoder 15 converts the text data into English character images using the selected English text conversion table, and outputs the English character images on a screen.

In another embodiment of the present invention, the microprocessor 17 checks a language code designated by a user. For example, the language code may include either a language code of a multi-subtitle designated in advance by a user in order to selectively reproduce a subtitle of a language desired by the user from among multi-subtitles written on a DVD, or a language code of multi-audio designated in advance by a user in order to selectively reproduce audio of a language desired by the user from among multi-audio written on a DVD When the language code is directly designated by the user, there is generally no need for the map table providing the relationship between the language and country code.

The language code designated by the user is designated without relation to a DivX file to be currently reproduced by a user, which is designated in order to reproduce a general DVD.

For example, the language code may include a language code of a multi-menu designated in advance by a user in order to display a menu of a language desired by the user from among multi-menus written on a DVD.

As illustrated in FIG. 2A, the microprocessor 17 selects a text conversion table (e.g. English text conversion table) of one predetermined language corresponding to the designated language code from the plurality of text conversion tables stored in the memory 16. And, the text decoder 15 converts the text data into English character images using the selected English text conversion table, and outputs the English character images.

Figure 3:
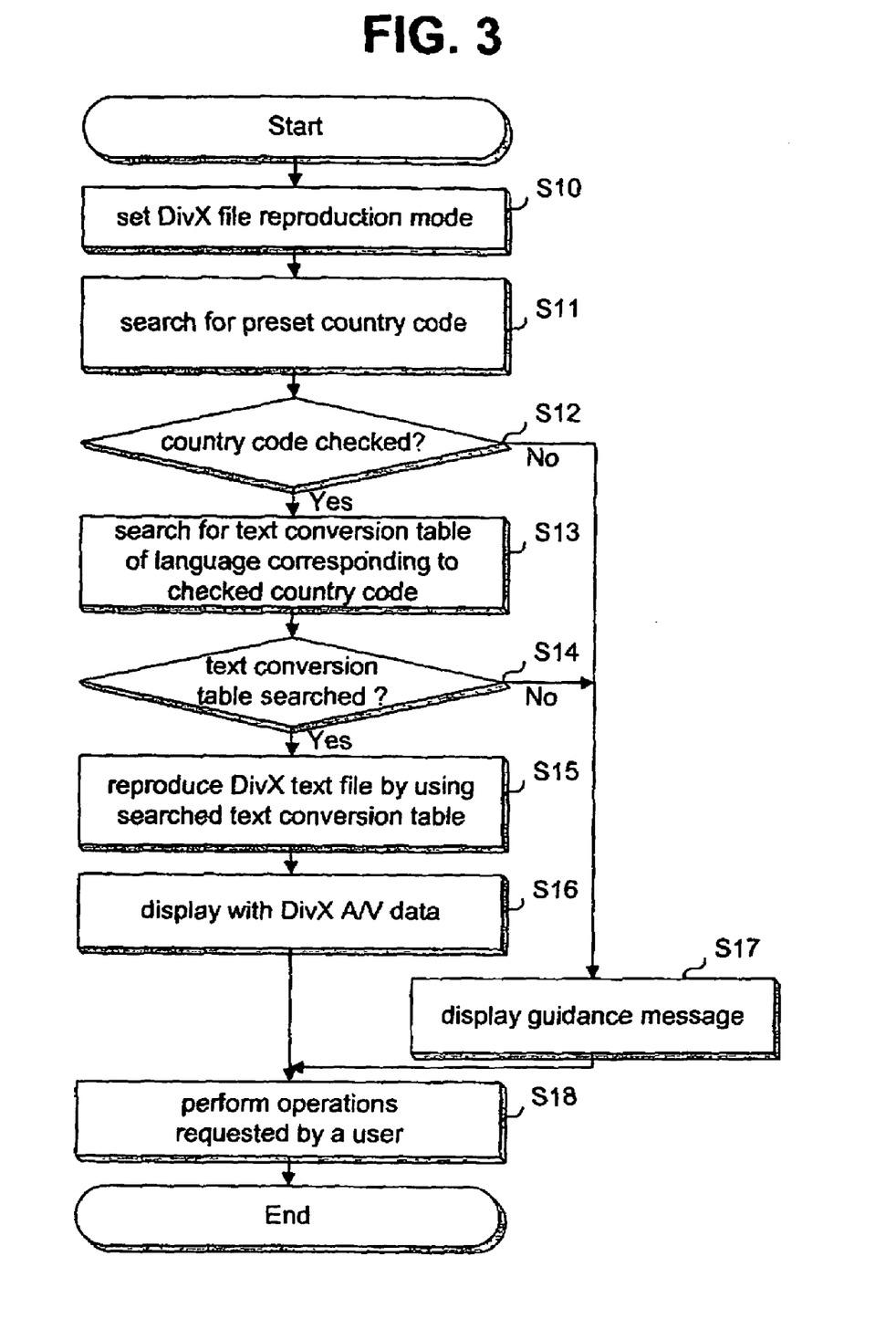
FIG. 3 is a flow diagram illustrating a method for reproducing texts in a digital video device according to an embodiment of the present invention.

FIG. 3 is a flow diagram illustrating a method for reproducing texts in a digital video device according to an embodiment of the present invention. This method can be implemented in the device of FIG. 1 or in other suitable device or system.

Referring to FIG. 3, when a DivX file reproduction mode for reproducing DivX files written on the optical disc 10 is set at a user's request (S10), the microprocessor 17 searches for a preset country code (e.g., one used as a reference when different parental lock levels are set in each country) from the memory 16, etc (S11).

Figure 2B:
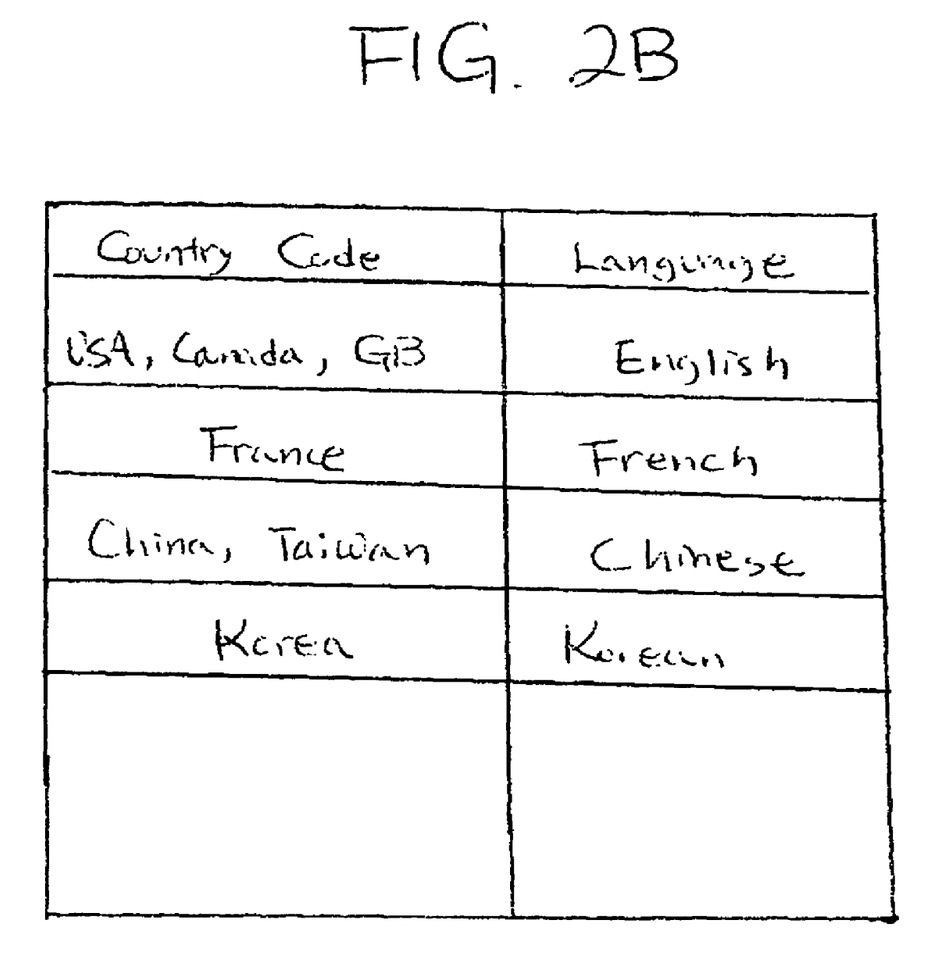
FIG. 2B is an example of a map table used in the present invention.

If the country code is found (S12), the microprocessor 17 searches for a text conversion table of a language corresponding to the country code among a plurality of text conversion tables stored in the memory 16 (S13) For example, when the country code indicates USA, the microprocessor 17 searches for an English text conversion table regarding English used in USA. This can be done referring to the map table as shown in FIG. 2B.

When the microprocessor 17 succeeds in searching for the English text conversion table (S14), the microprocessor 17 controls an operation of the text decoder 15, and performs a DivX text file reproduction operation for converting text data read by the play system 12 into English character images using the stored English text conversion table (S15).

Figure 4:
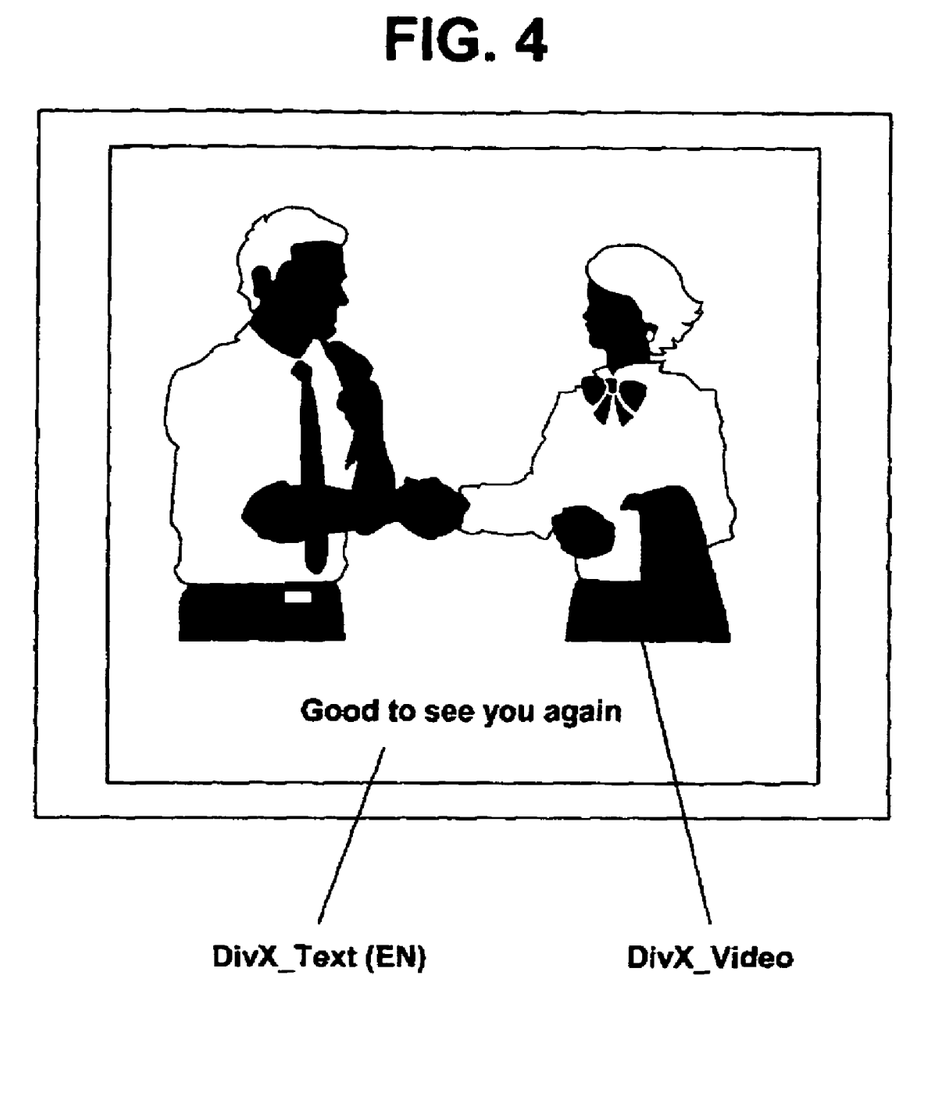
FIG. 4 is a diagram illustrating an example in which a character (text) image is displayed on a main video image according to an embodiment of the present invention.

Further, the microprocessor 17 controls operations of the audio decoder 13 and the video decoder 14, thereby enabling audio data of the DivX file to be output as audio of high quality and video data of the DivX file to be output as video of high quality Herein, the microprocessor 17 controls character images (e.g. English character images) output from the text decoder 15 to be displayed on or over the main video image as illustrated in FIG. 4 (S16).

In the meantime, at step S12 if the microprocessor 17 cannot locate a preset country code or cannot locate a text conversion table of the language corresponding to the located country code, the microprocessor 17 controls an operation of the OSD generator 18, thereby enabling a corresponding guidance message to be displayed on an OSD image, etc (S17). Such a guidance message may inform the user to manually select the language of a subtitle Then, the microprocessor 17 performs a corresponding operation requested by a user (S18). As a result, the DivX text data can be automatically converted into character images of a language mainly used by a user and can be automatically displayed over the main video image, without a user manually selecting the desired language of the subtitle or text image.

Figure 5:
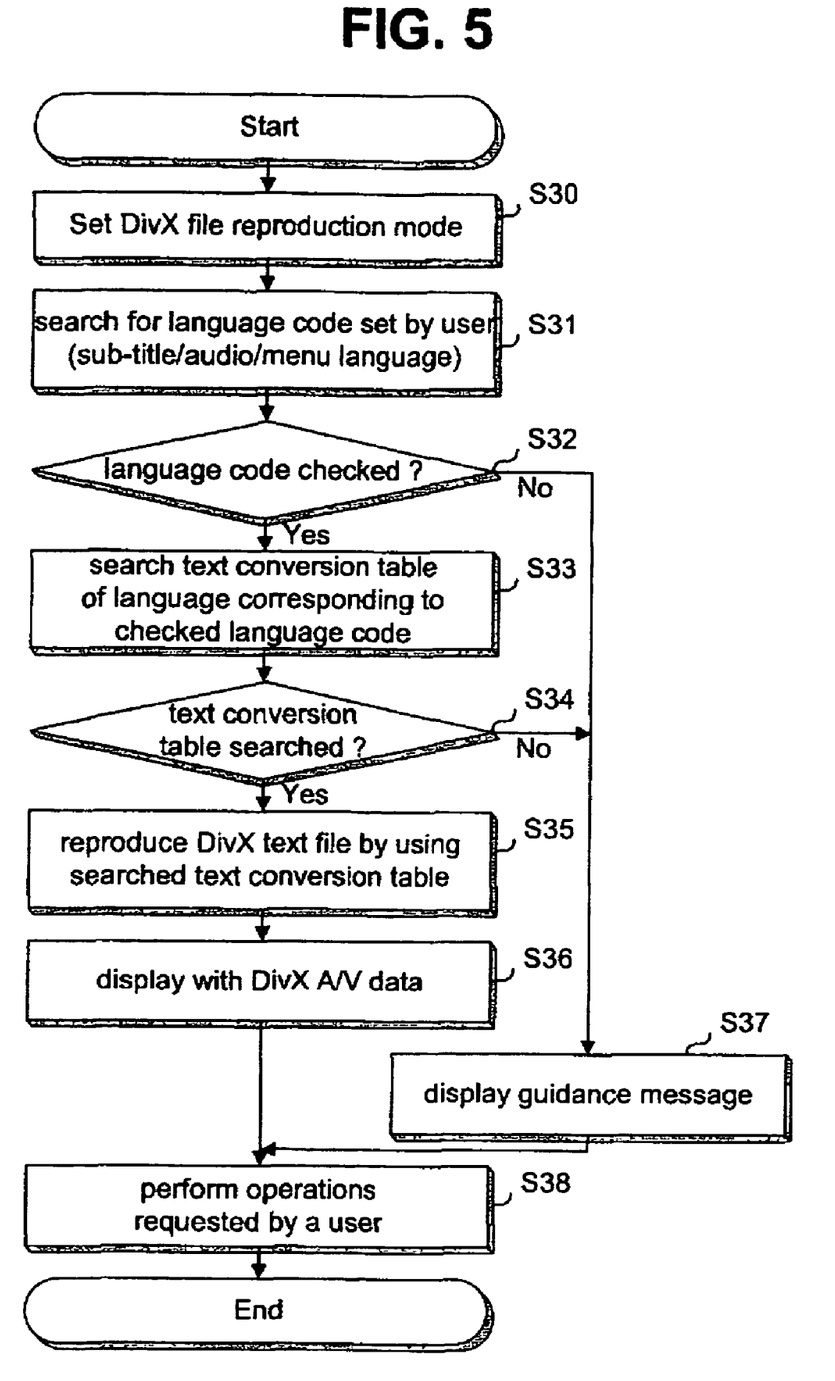
FIG. 5 is a flow diagram illustrating a method for reproducing texts in a digital video device according to another embodiment of the present invention.

FIG. 5 is a flow diagram illustrating a method for reproducing texts in a digital video device according to another embodiment of the present invention. This method can be implemented in the device of FIG. 1 or in other suitable device or system.

When a DivX file reproduction mode for reproducing DivX files written on the optical disc 10 is set at a user's request (S30); the microprocessor 17 searches for a language code set in the disc device from the memory 16 (S31) This language code can be set by a user using an input unit associated with the disc device.

For example, cases in which a user designates an English code in order to selectively reproduce a subtitle of a language desired by the user among multi-subtitles written on a DVD, etc, a user designates an English code in order to selectively reproduce audio of a language desired by the user among multi-audio, or a user designates an English code in order to display a menu of a language desired by the user among multi-menus, the microprocessor 17 looks for the language code set and stored in the memory.

If the language code (e.g., English) as set is found (S32), the microprocessor 17 searches for a text conversion table (e.g., English text conversion table) corresponding to the found language code among the plurality of text conversion tables stored in the memory 16 (S33). If the microprocessor 17 succeeds in searching for the English text conversion table (S34), the microprocessor 17 controls an operation of the text decoder 15, and performs a DivX text file reproduction operation for converting text data read by the play system 12 into English character images using the English text conversion table (S35)

And, the microprocessor 17 controls operations of the audio decoder 13 and the video decoder 14, thereby enabling audio data of the DivX file to be output as audio of high quality and video data of the DivX file to be output as video of high quality. Herein, the microprocessor 17 controls character images (e.g. English character images) output from the text decoder 15 to be displayed on the main video image as illustrated in FIG. 4 (S36)

In the meantime, if the microprocessor 17 cannot locate any language code set for the device or cannot locate the text conversion table of the language corresponding to the located language code, the microprocessor 17 controls an operation of the OSD generator 18, thereby enabling a corresponding guidance message to be displayed on an OSD image, etc. (S37). Then, the microprocessor 17 performs a corresponding operation requested by a user (S38) Steps S35-S38 correspond respectively to steps S15-S18 of FIG. 3

According to the present invention as described above, text data reproduced in connection with A/V data such as DivX data can be automatically converted into character images of a language mainly used by a user and can be automatically displayed on a main video image, e.g., by the operations of the microprocessor 17. Thus there is no need for a user to manually select the language of a subtitle or the language of audio each time a user desires to reproduce DivX audio/video data.

The preferred embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A method for reproducing texts in a digital video device, the method comprising:
checking for a country code or a language code preset in the digital video device;
reproducing text data stored on a recording medium based on the country code or the language code preset in the digital video device, wherein the reproducing step includes:
selecting a text conversion table of a language corresponding to the country code or the language code preset in the digital video device if the country code or the language code is preset in the digital video device; and
reproducing text data stored on the recording medium by converting the text data using the text conversion table selected if the country code or the language code is preset in the digital video device; and
reproducing the text data stored on the recording medium based on a country code or a language code inputted by a user, wherein the reproducing based on the country code or the language code inputted by the user includes:
outputting a guidance message if the country code or the language code is not preset in the digital video device;
receiving the country code or the language code from a user input through the guidance message if the country code or the language code is not preset in the digital video device;
selecting a text conversion table of a language corresponding to the country code or the language code received from the user; and
reproducing the text data by converting the text data using the text conversion table of the language corresponding to the country code or the language code received from the user through the guidance message outputted if the country code or the language code is not preset in the digital video device.

2. The method as claimed in claim 1, wherein the text conversion table of the language corresponding to the country code preset in the digital video device or the text conversion table of a language corresponding to the country code or the language code received from the user is selected using mapping information, and the mapping information identifies relationships between country codes and languages.

3. The method as claimed in claim 2, wherein the mapping information is prestored in a memory of the digital video device.

4. The method as claimed in claim 1, wherein the country code preset in the digital video device and the country code input by the user represent unique country identification code used as a reference when parental lock levels are set in the digital video device.

5. The method as claimed in claim 1, wherein the language code preset in the digital video device is preset by the user.

6. The method as claimed in claim 1, wherein the language code is preset in the digital video device to perform at least one of following to any recording medium inserted in the digital video device:
generation of sub-title in a particular language,
generation of audio data in a particular language, and
generation of menus in a particular language.

7. The method as claimed in claim 1, wherein the digital video device prestores a plurality of text conversion tables for different languages.

8. The method as claimed in claim 1, wherein the text data are included in a text file reproduced together with DivX audio and video files.

9. An apparatus for reproducing texts, the apparatus comprising:
- a controller to check for a country code or a language code preset in the apparatus and select a text conversion table for the apparatus, wherein the controller selects a text conversion table of a language corresponding to the preset country code or the language code if the country code or the language code is preset in the apparatus, and outputs a guidance message if the country code or the language code is not preset in the apparatus to receive a country code or a language code from a user input through the guidance message; and
- a text generator to reproduce text data stored on a recording medium by converting the text data using the text conversion table selected if the country code or the language code is preset in the digital video device, and to reproduce the text data by converting the text data using a text conversion table of a language corresponding to the country code or the language code received from the user input through the guidance message outputted if the country code or the language code is not preset in the digital video device.

10. The apparatus as claimed in claim 9, wherein the controller selects the text conversion table of the language corresponding to the preset country code or the input country code using mapping information, the mapping information identifying relationships between country codes and languages.

11. The apparatus as claimed in claim 10, wherein the mapping information is prestored in a memory of the apparatus.

12. The apparatus as claimed in claim 9, wherein the preset country code and the input country code represent a unique country identification code used as a reference when parental lock levels are set in the apparatus.

13. The apparatus as claimed in claim 9, wherein the preset language code is preset in the apparatus by the user.

14. The apparatus as claimed in claim 9, wherein the language code is preset in the apparatus to perform at least one of following to any recording medium inserted in the apparatus:
- generation of sub-title in a particular language,
- generation of audio data in a particular language, and
- generation of menus in a particular language.

15. The apparatus as claimed in claim 9, wherein the apparatus prestores a plurality of text conversion tables for different languages.

16. The apparatus as claimed in claim 9, wherein the text data are included in a text file reproduced together with DivX audio and video files.

17. A method for reproducing texts in a digital video device, the method comprising:
- checking for a country code or a language code preset in the digital video device;
- reproducing text data stored on a recording medium based on the country code or language code preset in the digital video device, wherein the reproducing step includes:
  - selecting a text conversion table of a language corresponding to the country code or the language code if the country code or the language code is preset in the digital video device; and
  - reproducing text data associated with DivX audio data and/or DivX video data using text conversion table selected if the country code or the language code is preset in the digital video device; and
- reproducing the text data stored on the recording medium based on a country code or a language code inputted by a user, wherein the reproducing based on the country code or language code inputted by the user includes:
  - outputting a guidance message if the country code or the language code is not preset in the digital video device;
  - receiving the country code or the language code from a user input through the guidance message if the country code or the language code is not preset in the digital video device;
  - selecting a text conversion table of a language corresponding to the country code or the language code received from the user; and
  - reproducing the text data associated with DivX audio data and/or DivX video data using the text conversion table of the language corresponding to the country code or the language code received from the user input through the guidance message outputted if the country code or the language code is not preset in the digital video device.

18. The method as claimed in claim 17, further comprising: reproducing the DivX audio and/or video data from the recording medium.

* * * * *